US009864597B1

(12) United States Patent
Marmaros et al.

(10) Patent No.: US 9,864,597 B1
(45) Date of Patent: *Jan. 9, 2018

(54) SYSTEMS AND METHODS FOR PROVIDING SOFTWARE UPDATES

(71) Applicant: Google Inc., Mountain View, CA (US)

(72) Inventors: David Marmaros, Mountain View, CA (US); Stephen R. Lawrence, Mountain View, CA (US); Mihai Florin Ionescu, Mountain View, CA (US); Niniane Wang, Mountain View, CA (US); Omar Habib Khan, Toronto (CA)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/200,851

(22) Filed: Jul. 1, 2016

Related U.S. Application Data

(63) Continuation of application No. 13/621,025, filed on Sep. 15, 2012, now Pat. No. 9,383,987, which is a continuation of application No. 10/749,441, filed on Dec. 31, 2003, now Pat. No. 8,321,858.

(51) Int. Cl.
*G06F 9/44* (2006.01)
*G06F 9/445* (2006.01)

(52) U.S. Cl.
CPC .................................. *G06F 8/65* (2013.01)

(58) Field of Classification Search
None
See application file for complete search history.

(56) References Cited

U.S. PATENT DOCUMENTS

| 5,838,968 | A  | 11/1998 | Culbert |
| 5,909,544 | A  | 6/1999  | Anderson et al. |
| 6,008,222 | A  | 12/1999 | Salazar |
| 6,014,665 | A  | 1/2000  | Culliss |
| 6,078,916 | A  | 6/2000  | Culliss |
| 6,162,068 | A  | 12/2000 | Wu |
| 6,199,204 | B1 | 3/2001  | Donohue |
| 6,378,128 | B1 | 4/2002  | Edelstein et al. |
| 6,493,871 | B1 | 12/2002 | McGuire et al. |
| 6,499,027 | B1 | 12/2002 | Weinberger |
| 6,539,340 | B1 | 3/2003  | Robins et al. |

(Continued)

OTHER PUBLICATIONS

U.S. Appl. No. 10/749,440, filed Dec. 31, 2003, Badros et al.

(Continued)

*Primary Examiner* — Chuck Kendall
(74) *Attorney, Agent, or Firm* — Fish & Richardson P.C.

(57) ABSTRACT

The present invention comprises systems and methods, and computer readable media comprising the methods, for updating software applications. The systems and methods of the present invention provide automation and flexibility to the updating process. Processor usage and network usage are monitored and software updates are initiated and/or continued during periods where processor and/or network usage are low. The update process may be halted when the processor and/or network connection are called upon for other uses. Processor and/or network usage may also be throttled, for example limiting the bandwidth available for the download to maintain sufficient processor share and/or bandwidth for other tasks. Adverse impact on a computer user is minimized.

20 Claims, 4 Drawing Sheets

(56) References Cited

U.S. PATENT DOCUMENTS

| | | | |
|---|---|---|---|
| 6,560,614 | B1 | 5/2003 | Barboy et al. |
| 6,581,056 | B1 | 6/2003 | Rao |
| 6,704,816 | B1 | 3/2004 | Burke |
| 6,862,623 | B1 | 3/2005 | Odhner et al. |
| 6,877,037 | B1 | 4/2005 | Adachi |
| 6,970,698 | B2 | 11/2005 | Majmundar et al. |
| 6,971,094 | B1 | 11/2005 | Ly |
| 6,990,660 | B2 | 1/2006 | Moshir et al. |
| 7,028,296 | B2 | 4/2006 | Foote et al. |
| 7,203,943 | B2 | 4/2007 | Shaffer |
| 7,516,118 | B1 | 4/2009 | Badros et al. |
| 7,707,573 | B1 | 4/2010 | Marmaros et al. |
| 7,734,867 | B1 | 6/2010 | Keeton et al. |
| 8,321,858 | B1* | 11/2012 | Marmaros ............... G06F 8/65 717/173 |
| 8,819,659 | B2 | 8/2014 | Ramer et al. |
| 9,383,987 | B1* | 7/2016 | Marmaros ............... G06F 8/65 |
| 2001/0003831 | A1 | 6/2001 | Boland |
| 2001/0054026 | A1 | 12/2001 | Choate |
| 2002/0143952 | A1 | 10/2002 | Sugiarto et al. |
| 2002/0152305 | A1 | 10/2002 | Jackson et al. |
| 2002/0166117 | A1 | 11/2002 | Abrams et al. |
| 2003/0033402 | A1 | 2/2003 | Battat et al. |
| 2003/0154112 | A1 | 8/2003 | Nellman et al. |
| 2003/0167266 | A1 | 9/2003 | Saldanha |
| 2003/0217297 | A1 | 11/2003 | Gschwind et al. |
| 2004/0098361 | A1 | 5/2004 | Peng |
| 2004/0143569 | A1 | 7/2004 | Gross et al. |
| 2004/0148484 | A1 | 7/2004 | Watanabe et al. |
| 2004/0221184 | A1 | 11/2004 | Hellerstein et al. |
| 2004/0255295 | A1 | 12/2004 | Stackhouse et al. |
| 2004/0261081 | A1 | 12/2004 | Sen |
| 2004/0267548 | A1 | 12/2004 | Jones |
| 2005/0091344 | A1 | 4/2005 | Chen et al. |
| 2005/0149932 | A1 | 7/2005 | Hasink et al. |

OTHER PUBLICATIONS

Silberschatz, A, et al., "Operating System Concepts," Sixth Edition, Mar. 8, 2002, pp. 27-52, 151-185 and 491-528 John Wiley & Sons Inc. New Jersey.
"Alexa Web Search—Toolbar Quick Tour," Alexa Internet, Inc., 1996-2006, [online] [Retrieved on Oct. 29 2006] Retrieved from the Internet<URL:http://pages.alexa.com/prod serv/quicktour new,html>.
Archive of "Remem: The Remembrance Agent," Bradley Rhodes, Feb. 16. 2004, www.remem.org, [online] [Archived by http://archive.org on Aug. 2, 2003; Retrieved on Oct. 20, 2006] Retrieved from the Internet<URL:http://web.archive.org/web/20030802195037/www.remem.org/>.
80-20 SoftWare—Products—80:20 One Search, http://www.80-20.com/products/one-search/retriever.asp. printed Mar. 16, 2004.
"askSam™ Making Information Userful," askSam,—Organize your information with askSam, http://www.asksam.com/brochure.asp, printed Mar. 15, 2004.
Alexa® Web Search—Toolbar Quick Tour, http://pages.alexa.com/prod_serv/quicktour.html, pp. 1-5, printed Mar. 16, 2004.
Barrett, R. et al.. "How to Personalize the Web," IBM Research, http://www.almaden.ibm.com/cs/wbl/papers/chi97/wbipeper.html. pp. 1-13, printed Mar. 16, 2004.
Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.
Boyan, J., et al., "A Machine Learning Architecture for Optimizing Web Search Engines," School of Computer Science, Carnegie Mellon University; May 10, 1968, pp. 1-8.
Brandenbaugh, F., "Chapter 1 the Client-Side Search Engine," *JavaScript Cookbook*, 1st Ed., Oct. 1999, O'Reilly™ Online Catalog, http://www.oreilly.com/catalog/lscook/chapter/c01.html, pp. 1-30, printed Dec. 29, 2003.
Brin, S., et al, "The Anatomy of a Large-Scale Hypertextual Web Search Engine," http://www7scu.edu.au/programme/fullpapers/1921/com1921.html, pp. 1-18, 1998.
Budzik, J., et al., User Interactions with Everyday Applications as Context for Just-in-time Information Access, Intelligent Information Laboratory, Northwestern University, pp. 1-8, no date.
DEVONthink, http://www.decon-technologies.com/products/deconthink.php, printed Mar. 16, 2004.
dtSearch®—http://www.dtsearch.com/, printed Mar. 15, 2004.
Dumais, S , et al, "Stuff I've Seen: A System for Personal Information Retrieval end Re-Use." Microsoft Research, *SIGIR'03*, Jul. 28-Aug. 1, 2003, pp. 1-8.
Enfish, http://www.enfish.com, printed Mar. 16, 2004.
Fast Search & Transfer—Home—Enterprise Search, http://www.solutions.altavista.com/en/news/pr_020402_desktop.shtmu, printed Mar. 16, 2004.
Fertig, S., et al., "Lifestreams: An Alternative to the Dosklop Metaphor," http://www.acm.org/sigchi/chi96/proceeddddings/videos/fertig/elf.htm. pp. 1-3, printed Mar. 16, 2004.
Geisler, G., "Enriched Links: A Framework for Improving Web Navigation Using Pop-Up Views," pp. 1-14, 2000.
ISYS Search Software—ISYS: desktop, http://www.isysuss.com/products/desktop/index.html, printed Mar. 16, 2004.
Joachims, T., et al., "WebWetcher: A Tour Guide for the World Wide Web," 1996.
Markoff, J,. "Google Moves Toward Clash with Microsoft," The New York Times, May 19, 2004, http://www.nytimes.com/2004/5/19/technology/19google.html?ex=1085964389&ei=1&e . . . , pp. 1-4, printed May 19, 2004.
Naraine, R., "Future of Search Will Make You Dizzy," Enterprise, May 20, 2004, http://www.internetnews.com/ent-news/articie.php/3356831, pp. 1-4; printed May 21, 2004.
"Overview." Stuff I've Seen—Home Page, http://research.Microsoft.com/adapt/sis/index.htm, pp. 1-2, printed May 26, 2004.
Rhodes, B.. "Margin Notes Building a Contextually Aware Associative Memory," The Proceedings of the International Conference on Intelligent User Interfaces (IUI'00), Jan. 9-12, 2000.
Rhodes, B., el al., "Just-in-lime information retrieval agents," Systems Journal, vol. 39, Nos. 3&4, 2000, pp. 685-704.
Rhodes, B., et al., "Remembrance Agent—A continuously running automated Information retrieval system," The Proceedings of the First International Conference on the Practical Application of Intelligent Agents and Multi Agent Technology (PAAM '96). pp. 487-495.
Rizzo, T., "WinFS 101: Introducing the New Windows Fee System." Longhorn Developer Center Home: Headline Archive. WinFS 101: Introducing the New . . . , http://msdn.Microsoft.com/Longhorn/archive/default.aspx?pull+/library/en-us/dnwinfs/htm . . . , pp. 1-5, printed Apr. 21, 2004.
"Searching for the next Google—New trends are helping nimble startups elbow in to the plundered market," Red Herring—The Business of Technology, Mar. 9, 2004, http://redherrieg.com/PrintArticle.aspx?a=4782&sector=Capital. p. 1-5, printed Mar. 30, 2004.
"Selecting Task-Relevant Sources for Just-in-Time Retrieval," pp. 1-3, no date.
Sherman. C., "HotBot's New Desktop Search Toolbar," www.searchenginewatch.com, http://searchenginewatch.com/searchdayiprint.php/34711 339921. pp. 1-3. printed Apr. 14, 2004.
"Standardization Priorities for the Directory—Directory Interoperability Forum White Paper," The Open Group, Dec. 2001, pp. 1-21.
Sullivan, D.. "Alta Vista Releases Search Software," *The Search Engine Report*, Aug. 4, 1998, pp. 1-2.
WebWatcher Home Page, "Welcome to the WebWatchcr Project " http://www-2.cs.cmu.edu/~webwatcher, printed Oct. 15, 2003.
"WhenU Just-In-Time Marketing," http://www.whenu.com, printed Mar. 19, 2004.
X1 instantly searches files & email. For outlook, Outlook, http://www.x1.com/, printed Mar. 15, 2004.
Zellweger, P., et al., "Fluid Links for Informed and Incremental Link Transitions," Proceedings of Hypertext'96, Pittsburgh, PA, Jun. 20-24, 1998, pp. 50-57.

(56) References Cited

OTHER PUBLICATIONS

Baiazinska, M., et al., "Characterizing mobility and network usage in a corporate wireless local-area network", Proceedings of MobiSys 2003: The First International Conference on Mobile Systems, Applications, and Services, USENIX Association, May 5-8, 2003, pp. 303-316, Can be retrieved online at <URL:http://delivery.acm.org/10.1145/1 070000/1 066127/p303-balazinska.pdf>.

Dalai, A., et al., "An optimal service ordering for a world wide web server", ACM Sigmetrics Performance Evaluation Review, Sep. 2001, pp. 8-13, vol. 29, issue 2. Can be retrieved online at <URL http://delivery.acm.org/1 0.1145/580000/672319/p8-dalal.pdf>.

Hsieh, H-Y et al., "A transport layer approach for achieving aggregate bandwidths on multi-horned mobile hosts", MOBICOM'02, Sep. 23-28, 2002, pp. 83-94. Can be retrieved online at <URL:http://delivery.acm.org/10.1145/580000/570656/p83-hsieh.pdf>.

Liu, Y., et al., "On the impact of concurrent downloads", Winter Simulation Conference Proceedings of the 33rd conference on Winter simulation, Dec. 2001, pp. 1300-1305. Can be retrieved online at <URL:http://delivery.acm.org/10.11451570000/564314/p1300-liu.pdf>.

Silberschatz, A., et al., "Operating System Concepts," Sixth Edition, Mar. 8, 2002, pp. 27-52, 151-185 and 491-528, John Wiley & Sons, Inc., New Jersey.

\* cited by examiner

SYSTEMS AND METHODS FOR PROVIDING SOFTWARE UPDATES

CROSS-REFERENCE TO RELATED APPLICATIONS

This application is a continuation of U.S. patent application Ser. No. 13/621,025 (now allowed), filed on Sep. 15, 2012, which is a continuation of U.S. patent application Ser. No. 10/749,441 (now U.S. Pat. No. 8,321,858), filed on Dec. 31, 2003. The disclosures of the above applications are expressly incorporated herein by reference in their entireties.

FIELD OF THE INVENTION

The present invention relates to computer systems and computer software including server and client systems on a network, and in particular, providing updates from one computing device to software residing on another computing device.

BACKGROUND

Computer software applications (e.g., computer programs and data files associated with the programs) are generally updated over time. Software updates may be desirable for many reasons, including but not limited to one or more of the following: to repair or patch portions of a computer program; to add functions to a computer program; to increase compatibility of a program with an operating system or computer hardware, for example an updated operating system; to increase compatibility of a program with other software; to add additional components; to display custom messages to the user; and/or in response to a computer virus.

Currently, several methods are used to update software applications. A relatively simple one of these is to distribute one entire software application to replace an older one. This method, the "full update" method, though relatively simple, is typically expensive and inconvenient. Because of the large size of some software applications it may not be feasible to distribute such updates over computer networks, such as the Internet.

In order to bypass many of the problems associated with this type of software updating, some software publishers distribute "incremental updates." These updates do not contain entire software applications, but rather only that information that allows a given version of a software application to a newer version. Among the methods available to perform such incremental software updating is binary patching, performed by programs such as RTPatch, published by Pocket Soft, Inc. A binary patcher typically replaces only those binary bits of a software application which are different in a newer version.

Because most software updates involve changes to only a small portion of a software application, a binary patcher may use, in addition to the old software application, only a small data file including the differences between the two versions. The smaller data files distributed for a binary patch update are often less than 1% of the size of a full update, taking advantage of the large amount of redundancy in the two versions.

Computer networks, such as the Internet, also provide a channel for distribution of software updates. In a conventional approach, a software vendor constructs a software update as a "package" for download by one computer system from another over a network (e.g., the Internet, a private intranet, a peer-to-peer network, etc.). This package is typically a self-extracting executable file with the setup program and each of the product's updated files embedded and compressed to make the package smaller. The size of the package is generally the sum of the compressed sizes of each changed file, plus the size of the extraction code itself (plus the code and/or UI to complete the update process). Upon execution, the package extracts each of the contained filles to a temporary location, then starts the setup program to install each file to a proper location in the system's directory. Files that are shipped in a compressed form are decompressed as they are installed.

Even though networks such as the Internet allow wide and quick distribution of software updates possible, the limited bandwidth of network transmission may cause problems. Further, such methods for updating software may require user input. In addition to interrupting the user's computer experience, the necessity for user input may lead to software downloads occurring during periods of peak network usage. Further, the software download may utilize network transmission bandwidth that the user, or user's network, would rather use for other priorities.

Thus, it would be useful to have an improved method and system for updating software.

SUMMARY OF THE INVENTION

The present invention comprises systems and methods for updating software. In one embodiment, usage of a computing device may be monitored and software updates may be initiated and/or continued during a time period determined based on the usage of one or more aspects of the computing device. In an embodiment, the determination of whether to initiate or continue an update process may be made by monitoring user activity, processor usage, disk usage; memory usage and/or network usage. Initiation or continuation of the update process may occur when usage of one or more of the aspects of the computing device is below a threshold level. In one embodiment of the present invention, the activity level of the update process may be reduced when the activity level one or more of the foregoing aspects of the computing device increases, for example above the threshold level. By way of example, in one embodiment, processor and/or network usage may also be throttled, for example limiting the bandwidth available for a software update to maintain sufficient processor share and/or bandwidth for other tasks.

Details of exemplary embodiments of the present invention, including their features and advantages, are set forth below.

BRIEF DESCRIPTION OF THE FIGURES

Features, aspects, and advantages of the present invention are better understood when the following Detailed Description is read with reference to the accompanying drawings, wherein.

DETAILED DESCRIPTION

The present invention provides systems and methods for updating software applications. The systems and methods allow updating software applications residing on computers residing on a wide area or local area network, such as the Internet/World Wide Web.

In one embodiment, software updates may be provided from a software vendor's/publisher's server to individual computers using an Internet-capable communications protocol. Individual computers may access the Internet, for example, through a dial-up or broadband connection. Some broadband connections include T1 connections, Cable connections or DSL connections. The individual computer may reside on a network and access the Internet through a single network connection. In this environment, bandwidth limitations will likely exist among the individual computers on the network and between the network and the Internet.

In one embodiment, the present invention provides a method for updating a software application on a computing device, comprising: monitoring a usage of at least one aspect of the computing device; determining that at least a component of a resident software application on the computing device should be updated; and updating the component of the resident software application during a time based on the usage of the at least one aspect of the computing device. In one embodiment of the present invention, aspects of a computing device that may be monitored include, but are not limited to: user activity; processor activity; memory activity; network/communication activity; and/or storage medium activity (for example, disk activity). User activity may comprise: inputting data; using an input device; using a storage device; accessing a component of the computing device; and/or other activity generally performed by a user of a computing device. Processor activity may comprise: processing requests; processing data; processing commands and/or similar activity performed by and/or with reference to processors of computing devices. Memory activity may comprise: accessing memory; reading memory; formatting memory; a call to memory; and/or similar activity performed by and/or with reference to memory of a computing device. Network/communication activity may include: transferring of data using network bandwidth; accessing a communications port; accessing a network; receiving commands from a network; and similar activity performed on and/or with reference to networks of computing devices. Storage medium activity may include: accessing a storage medium; reading a storage medium; formatting a storage medium; storing data on/in a storage medium and similar activity performed in and/or with reference to storage medium associated with a computing device.

The level of processor activity that may be used as the basis for initiating or continuing an update in one embodiment of the present invention may be determined based on consideration of one or more of the following criteria: the processor is substantially inactive; sufficient processor resources are available despite other tasks being performed by the processor; sufficient processor resources are available in between other tasks being performed by the processor; and similar criteria.

The level of network activity that may be used as a basis for initiating or continuing an update in one embodiment of the present invention may be determined based on consideration of one or more of the following criteria: network activity is substantially inactive; sufficient network bandwidth is available for the installation despite other network activity; sufficient network bandwidth is available in between other network activity; and similar criteria.

The level of storage medium activity that may be used as a basis for initiating or continuing an update in one embodiment of the present invention may be determined based on consideration of one or more of the following criteria: disk activity is substantially inactive; disk access is available for the installation despite other computing device activity; sufficient disk access is available in between other activity; and similar criteria.

The level of memory activity that may be used as the basis for initiating or continuing an update in one embodiment of the present invention may be determined based on consideration of one or more of the following criteria: requests to the memory are substantially inactive; sufficient memory resources are available despite other tasks being performed by the computing device; sufficient memory resources are available in between other tasks being performed by the computing device; and similar criteria.

The level of user activity that may be used as the basis for initiating or continuing an update in one embodiment of the present invention may be determined based on consideration of one or more of the following criteria: user activity is substantially inactive; user activity will not be impaired by update activity; and similar criteria.

The determination that a software component should be updated may be based on one or more of the following factors: the availability of a different version or version number of the software component, for example a more current version or version number; the desirability of increasing functionality of the component to be updated or other software components associated with the component to be updated; a software publisher's desire to update the component; a network administrator's desire to the update the component; and/or a user of the computing device's desire to update the component.

In one embodiment, the present invention provides a method for updating a software application on a first computing device, the first computing device including a processor, the method comprising: a. determining the availability of an update to the software application at a second computing device; and b. initiating transfer of the update to the first computing device at a time determined based on an activity level of the processor. In an embodiment the first computing device and the second computing device reside on a network and the method further comprises monitoring network activity level on the first computing device and initiating transfer of the update at a time determined based on the network activity level.

In one embodiment, the present invention provides a method for updating a software application on a computing device including a processor and a network connection comprising: monitoring usage of the processor; determining that a software application on the computing device should be updated; and initiating an update of the resident software application when a more current version of the resident software application is available at a time determined by an activity level of the processor. In one embodiment the method may further comprise monitoring the activity level of the network connection and initiating an update of the resident software during a time period determined by the activity level of the network connection.

In one embodiment of the invention, a method is provided that allows updating a software application on a computing device including a processor and a network connection. The method includes monitoring usage of the processor; identifying a resident software application on the computer; determining the version of the software application; comparing the version of the software application to a more current version of the software application; and initiating or continuing an update of the resident software application when the resident software application is not a more current version of the software application at a time determined by the level of processor activity. In one embodiment, the method may further include monitoring usage of the network connection and initiating or continuing an update the resident software at a time determined by the level of network activity.

In one embodiment, a method is provided for updating a software application on a computer including a processor and a network connection. The method includes monitoring usage of the network connection; identifying a resident software application on the computer; determining the version of the software application; comparing the version of the software application to a more current version of the software application; and initiating or continuing an update of the resident software application when the resident software application is not a more current version of the software application during a time period based on the level of network activity. In an embodiment, the method may further comprise monitoring usage of the processor and initiating or continuing an update the resident software during a time period based on the level of processor activity.

In one embodiment, a method of the present invention for updating a software application on a computer including a processor and a network connection comprises: monitoring usage of the network connection; identifying a resident software application on the computer; determining the version of the software application; comparing the version of the software application to a more current version of the software application; and initiating or continuing an update of the resident software application when the resident software application is not a more current version of the software application during a time period when the network connection is being used to download other data. In an embodiment, the method may further comprise monitoring usage of the processor and initiating or continuing an update the resident software during a time period based on the level of processor activity.

Initiating an update may include the transfer of information from a first computing device (the "updating computer") to the computer having the resident software application being updated (the "updated computer"). Continuing an update may include continuing the transfer of the file from the software publisher's network server; at least partially installing the update on the computer comprising the resident software application; completing the installation of the update on the computer comprising the resident software application or combinations of the foregoing.

One or more of the foregoing methods may further include throttling the transfer rate and/or the installation rate to limit the bandwidth and/or portion of the processor used for the update.

In embodiments where the updated computer resides on a local or wide area network, monitoring usage of the network connection may include monitoring one or a combination of indications of network usage, including without limitation monitoring usage of the connection between the computer comprising the resident software application and the local or wide area network server and/or monitoring usage of the network connection between the local or wide area network server and the Internet.

A system of the present invention comprises computer hardware and software for performing a method of the present invention. Computer readable media of the present invention comprises virtual or physical computer readable media described below containing program instructions for performing a method of the present invention.

In one embodiment, the present invention is implemented in a system architecture such as the one described in commonly assigned, co-pending, U.S. patent application Ser. No. 10/750,128, filed Dec. 31, 2003, entitled Methods and Systems for Regulating Resource Usage, the disclosure of which is hereby incorporated herein by reference.

Figure 1A:
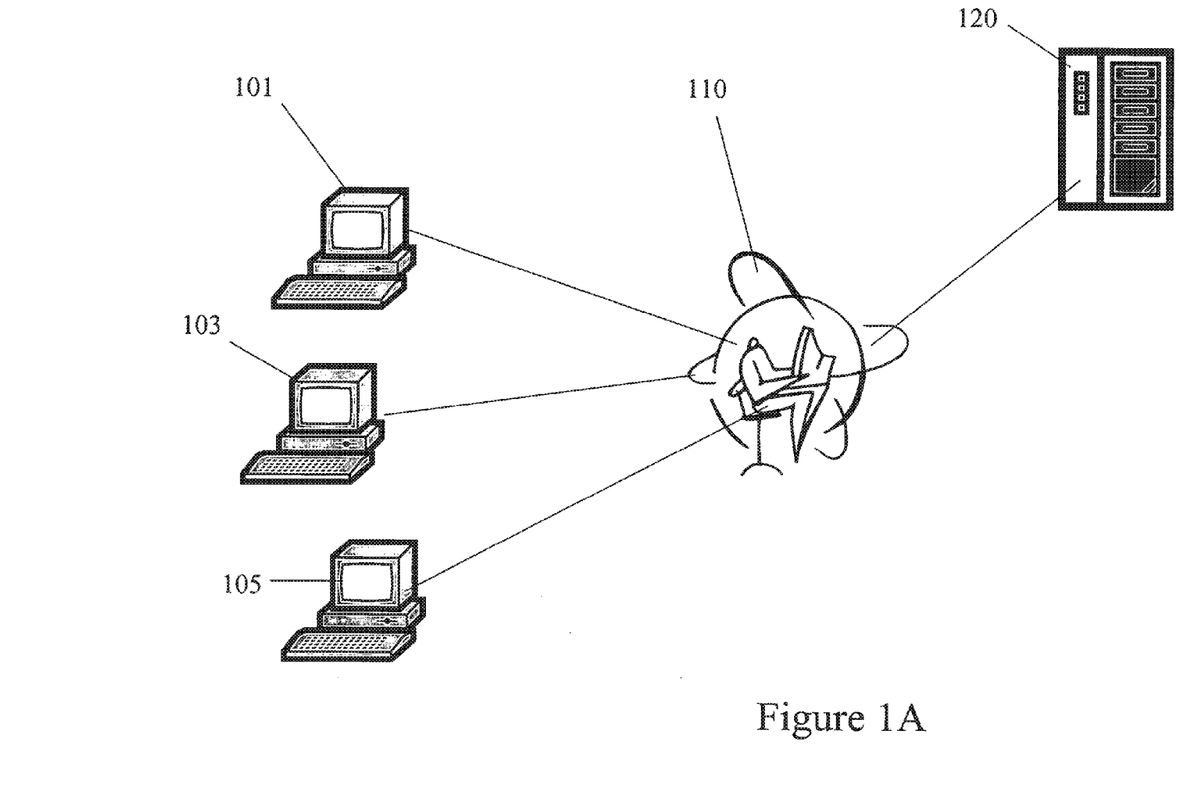
FIG. 1A is a schematic overview of servers and computers interconnected via the Internet/World Wide Web.

Referring now to the drawings in which like numerals indicate like elements throughout the several figures, and wherein in the description below "device" may be used to indicate "computing device", FIG. 1 is a block diagram illustrating an exemplary environment for implementation of an embodiment of the present invention. The environment shown reflects the World Wide Web. Individual client devices 101, 103 and 105, etc. are connected to the Internet 110. Each connection may independently comprise a dial-up connection, for example through a modem and a wired or wireless telephone link; a broadband connection, for example through a T-1 line, cable modem, ADSL line and modem; a wireless network connection, for example through an 802.11 protocol, Bluetooth or the like; or any other method of connecting to the Internet. The environment also includes a software publisher's server device 120 which is also connected to the Internet. The individual client devices may communicate with the software publisher's server using telecommunications protocol via the Internet.

As set forth above, in methods and systems of the present invention computing devices may include devices such as cell phones, personal digital assistants, pagers, automatic teller machines which may not be connected to the Internet. These devices may therefore communicate with other computing devices using communication protocols different from the types of protocols used in Internet communication. Thus, embodiments of the present invention should not be viewed as limited to utilizing only Internet capable communication protocols, but rather open to use of other communications protocols.

Figure 1B:
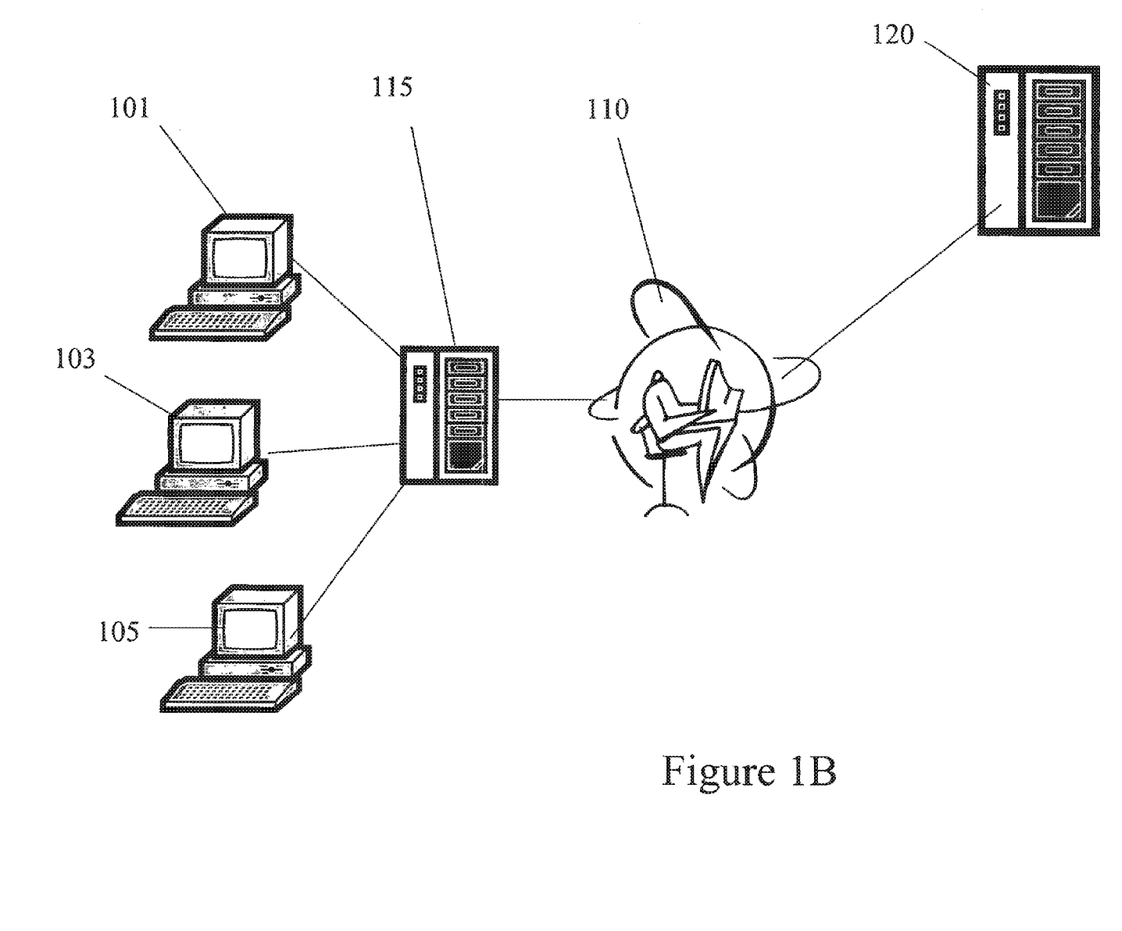
FIG. 1B is a schematic overview of a local/wide area connection to other servers via the Internet/World Wide Web.

FIG. 1B depicts an alternate environment. In the environment of FIG. 1B, client devices 101, 103 and 105 are networked, for example in a local area network or wide area network through network server device 115. Network server device 115, communicates with the Internet, 110.

The server device 115 may include a processor coupled to a computer-readable memory and a communications device. Server device 115, depicted as a single computer system, may be implemented as a network of computer processors. Examples of a server device 115 are servers, mainframe computers, networked computers, a processor-based device, and similar types of systems and devices. The server processor can be any of a number of computer processors, such as processors from Intel Corporation of Santa Clara, Calif. and Motorola Corporation of Schaumburg, Ill.

The server memory may include any of the processors described below with reference to client devices and a method of the present invention.

It should be noted that the present invention may comprise systems having different architecture than that which is shown in FIGS. 1A and 1B. For example, in some systems according to the present invention, server device may comprise a single physical or logical server. The system shown and described is merely exemplary, and is used to explain the exemplary methods described below and depicted in part in FIGS. 2 and 3.

The client devices each include a computer-readable medium, for example a random access memory (RAM), coupled to a processor. The processor executes computer-executable program instructions stored in memory 108. Such processors may include a microprocessor, an ASIC, state machines, or other processor, and can be any of a number of computer processors, such as processors from Intel Corporation of Santa Clara, Calif., IBM Corporation of Raleigh, N.C. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor of the client device with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++,C#, Visual Basic, Java, Python, Perl, and JavaScript, and/or other binary, compiled interpreted or assembly languages.

Client devices can be connected to a network, as shown in FIG. 1B, or can be stand-alone machines, as shown in FIG. 1A. Client devices may also include a number of external or internal devices such as a mouse, a CD-ROM, DVD, a keyboard, a display, or other input or output devices. Examples of client devices are personal computers, digital assistants, personal digital assistants, cellular phones, mobile phones, smart phones, pagers, digital tablets, laptop computers, Internet appliances, and other processor-based devices. In general, the client devices may be any type of processor-based platform that operates on any operating system, such as Microsoft Windows®, PocketPC, Palm, Apple OS, UNLX, JAVA, EPOCH, Linux or the like, capable of supporting one or more client application programs. For example, the client device shown comprises a personal computer executing client application programs, also known as client applications. The client applications can be contained in memory and can include, for example, a word processing application, a spreadsheet application, an e-mail application, an instant messenger application, a presentation application, an Internet browser application, a calendar/organizer application, and any other application capable of being executed by a client device.

A user can interact with the various client applications and articles associated with the client applications via various input and output devices of the client device. Articles include, for example, word processor, spreadsheet, presentation, e-mail, instant messenger, database, and other client application program content files or groups of files, web pages of various formats, such as HTML, XML, XHTML, Portable Document Format (PDF) files, and audio files, video files, or any other documents or groups of documents or information of any type whatsoever.

The user's interaction with articles, the client applications and the client device creates event data that may be observed, recorded, analyzed or otherwise used. An event can be any occurrence possible associated with an article, client application or client device, such as inputting text in an article, sending an article, receiving an article, manipulating an input device, opening an article, saving an article, closing an article, opening a client application program, closing a client application program, idle time, processor load, memory usage, and any other possible interaction with an article or a client application program whatsoever.

For operation of the present invention, the memory of the client device includes a capture processor, a queue, an update processor and a data store. The memory of the client device also contains a search engine application program, also known as a search engine. The search engine can locate relevant information on the client device, the network and/or the World Wide Web and provide a result set.

The capture processor can capture events and associated client articles associated with the client applications. In an embodiment the capture processor comprises multiple capture components. For example, the capture processor shown comprises a separate capture component for each client application. The capture component for each client application may comprise infonnation relating to the current version of the application, and/or application features, and utilization of features of the application. The capture processor also comprises a separate capture component that monitors overall network activity in order to capture event data associated with network activity, such as data transfer in and out of the client device. The capture processor further comprises a separate capture component that monitors overall client device performance data, such as processor load, disk access, the client applications in use, and the amount of memory available.

In one embodiment, the capture processor through the individual capture components monitors activity on the client device and captures the event by a generalized event registration mechanism, such as an event schema. Each capture component can register its own event schema or can use a predefined one. Event schema can differ depending on the client application or activity the capture component is monitoring. Generally, the event schema can describe an event by providing data associated with the event and any associated article as well as the content of any associated article. For example, an event schema for an email event received by a user can include header information, such as the content from the subject, to, from, cc, and time received fields, and body information. An event schema for a web page currently being viewed by a user can include the Uniform Resource Locator or URL of the web page and the content of the web page. An event schema for a word processing document being saved by a user can include the title of the document, the time saved, the location of the document, the format of the document, the text of the document, and a pointer to the location of the document.

The capture processor can capture events in real time or real time events and can capture events that have occurred in the past or historical events. Real time events can be loading, saving, or viewing an article, such as saving a word processing document, viewing a web page, viewing an email, and saving an MP3 file, and updating the metadata of an article, such as bookmarking a web page, printing a presentation document, deleting a word processing document, and moving a spreadsheet document. Some real time events are contextual and relate to current user state or context. For example, contextual events can be loading, saving or viewing an article, such as saving word processing document, viewing a web page, viewing an email, and saving an MP3 file, examining a portion of an article, such as selecting a portion of text, moving a mouse over a portion of a web page, and viewing a slideshow, changing an article, such as typing a word in an email or pasting a sentence in a word processing document, and closing a document, such as closing an instant messenger window or changing an email message being viewed.

Historical events are similar to real time events. Examples of historical events include, the user's saved word processing documents, the emails in a user's inbox, and the web pages bookmarked by the user. Historical events can be captured by the capture processor by periodically crawling the memory and any associated data storage device for events not previously captured by the capture processor.

Events captured by the capture processor are sent to a queue in the form of event schema. The capture processor can also send performance data to the queue. The queue holds the events and performance data, for example until the search engine is ready to process an event or the performance data. The queue can comprise three separate queues one for contextual events, one for indexable events, and one for performance data. The queue can be implemented as a circular priority queue using memory mapped files. Other implementations of the queue are possible. The indexable queue can be a two priority queue where higher priority events are served before lower priority events. Generally, real time events are given higher priority than historical events.

The search engine comprises an indexer, a query system, and a formatter. real time events, contextual and indexable, and performance data can be sent by the queue to the query system to provide the query system with information concerning current user context. In an embodiment of a method of the present invention, client application capture component data relating to the version and usage of features of a client application may be sent by the queue to the query system. Client application capture component data may include one or more of the following types of data: data relating to the version of a client application; data relating to usage of a client application; data relating to updates of a client application; data relating to installation of a client application and the like. The query system may use this information to generate a query, which may or may not be implicit, to the publisher of the client application and receive data from the publisher of the client application relating to the current version of the features of the client application. The data received is compared to data in the queue to determine whether the client device contains the most recent version of one or more features of the client application. The data comparison may be performed by the update processor.

In one embodiment of the present invention, the search engine may generate an update query to the software publisher from time to time, e.g., on a fixed time interval, such as every 24 hours, every hour, every 15 minutes, or as may be determined appropriate for a particular implementation. A query may also be generated when the capture processor determines a feature of the client application is being opened, when the capture processor determines a feature of the client application has not been used for a certain time interval, and/or when some other condition has been met. The update processor may also communicate with the search engine and the queue and process performance data from the capture processor.

Figure 2:
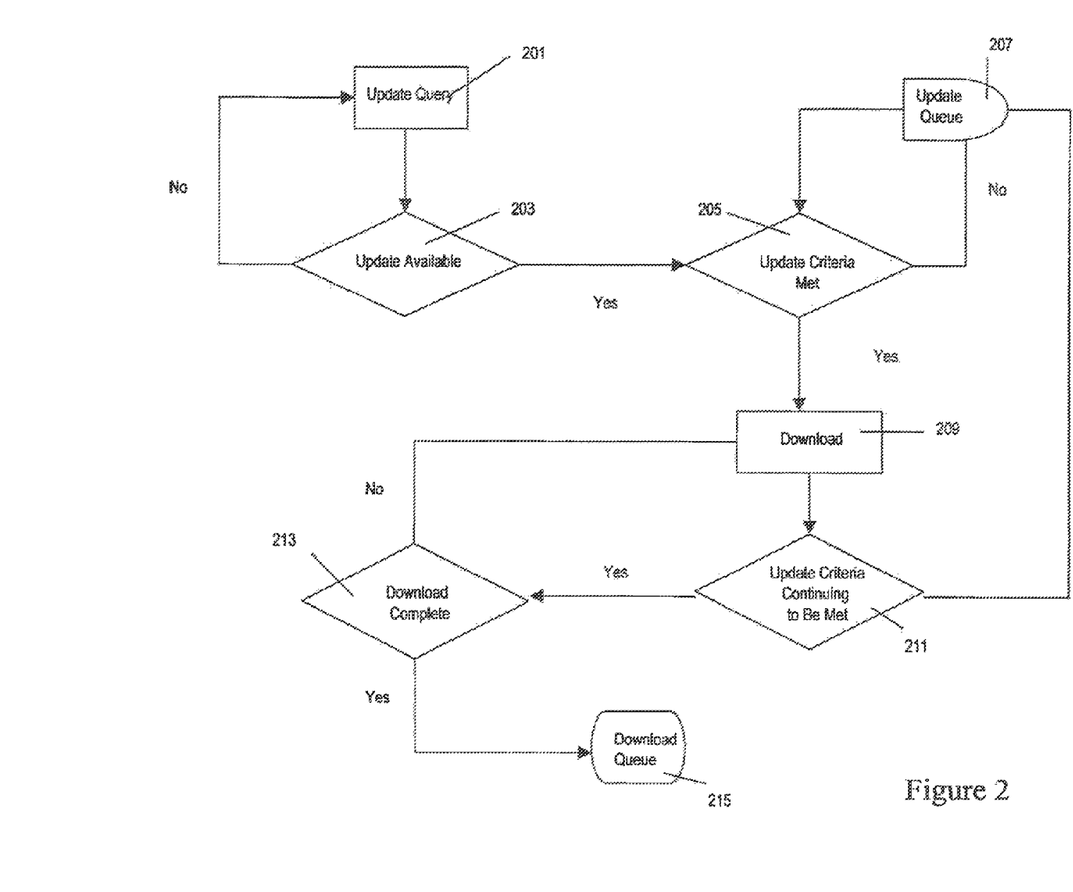
FIG. 2 is a flowchart of an update process in an embodiment of the present invention.

The updating process may be managed by the update processor. As shown in FIG. 2, the update query, 201, generates an update query result comprising update data from the software publisher. By way of example, using plain English, the query process may proceed as follows: "I am product X version 102 English, I have an ID number 12445562, and I was installed Mar. 23, 2003 at 1:34 pm. Do you have a new version that I should install?". When a comparison between the query result and the captured data in the queue indicates the software publisher has updated a feature of the application 203, the update processor may begin the update process by generating an update location query to locate the update from the software publisher. By way of example, in plain English: "when program X version Y language Z calls, I should tell them to download the following . . . " The query may be initiated and downloading of the software update from the software publisher begun, or resumed, when the performance data indicates download criteria, 205, have been met. The download criteria may comprise one or more of the following criterion, or combinations thereof: the client application feature to be updated is not being utilized; the client application feature to be updated has not been used for a period of time; overall processor usage is below a threshold; the available bandwidth for downloading is above a set threshold; outgoing bandwidth is below a threshold; incoming bandwidth is below a threshold; the system judges the user is likely to find the feature useful (for example, the system may know that a new PDF translator is available, but if the user has never actually viewed PDF files, it might be deemed unnecessary to install it); memory available is above a set threshold; the computing device has been inactive for a specified period of time; the current date/time is within a specific time window (for example, nighttime on a weekend]; and/or the configuration or current state of the computing device (for example, the screensaver is on, device is connected to the internet); based on one or a combination of some other indication of performance or resource usage that may be affected by an update download. If a download criterion is not met, the update query is queued in update queue 207. In one embodiment, the update processor rechecks the performance data at one or more later times to determine whether download criteria have been met; in one embodiment, rechecking may be done, for example, at predefined intervals. If download criteria are met, the download, 209, is made to a download queue, 217, which is contained in the processor ory. The update processor also processes performance data during the download process to ensure that the download criteria continue to be met, 211. If during a download a download criterion fails to be met, for example if the client device needs network bandwidth for other uses, the downloading activity may be reduced, slowed and/or halted. The downloaded data already obtained may be stored in the update queue 207. Downloading aactivity may be increased when the download criteria are met again. In one embodiment of the present invention resumption of downloading activity does not require that the portion originally downloaded be re-downloaded. When downloading is complete, 213 the downloaded file may be maintained in a download queue 215 until initiating of an installation process.

In one embodiment, during downloading, the update processor may monitor network usage and thereby available bandwidth. The update processor may also limit or otherwise control or adjust bandwidth used by the download process. This control of bandwidth use is referred to herein as throttling. For example, the update processor may throttle the downloading to use lesser amounts of network bandwidth when the performance data indicates another use of bandwidth, and to use greater amounts of network bandwidth when the performance data indicates availability.

In one embodiment, the update processor may use performance data and/or other captured data to determine whether the downloading process may be masked by processing being undertaken by the client device. For example, if the client device is processing streaming media from the Internet and there is available bandwidth, the update processor may use some of the available bandwidth to initiate or complete downloading of an update.

After downloading is complete, the update processor may initiate an installation process for installing the update. An example of one installation process that may be used is described in commonly assigned, co-pending, U.S. patent application Ser. No. 10/749,439, filed Dec. 31, 2003, entitled "Systems and Methods for Providing and Installing Software", the disclosure of which is hereby incorporated herein by reference.

Some software packages will automatically initiate an installation process after downloading. The update processor may initiate installation for packages that do not begin installation themselves. In one embodiment, the update processor may monitor performance data during the installation process and begin installation when performance data indicates other client applications will not be adversely impacted. In this regard a set of installation criteria, for example, similar to the download criteria may be used.

Figure 3:
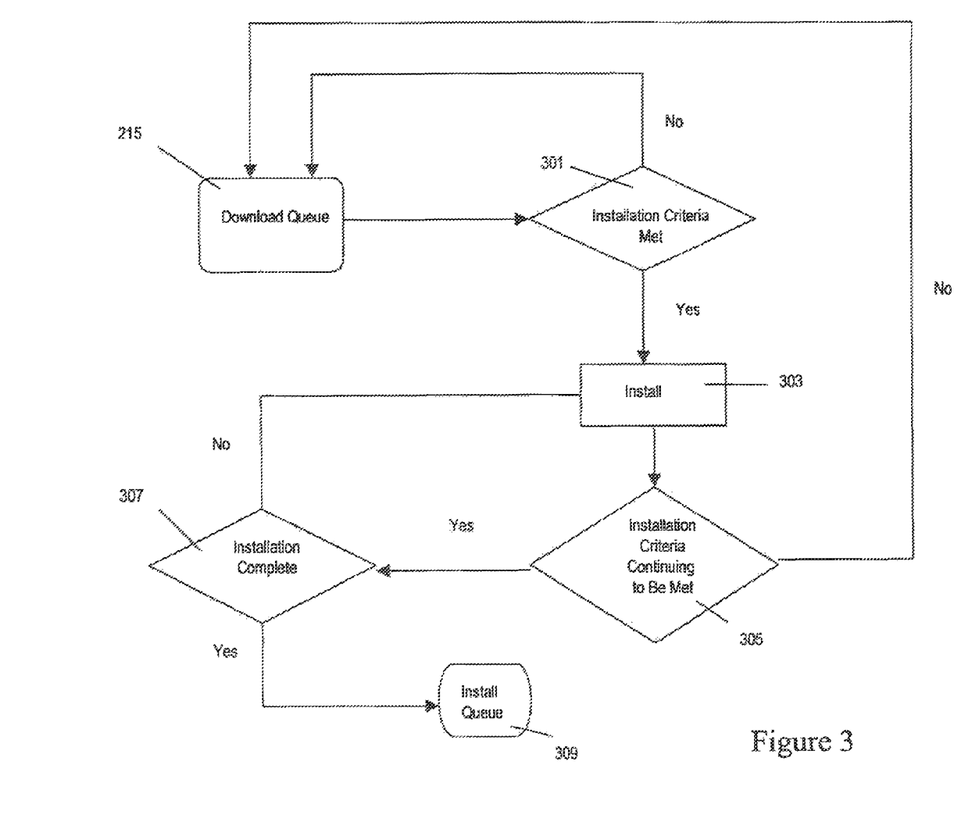
FIG. 3 is a flowchart of an installation process in an embodiment of the present invention.

FIG. 3 provides an overview an installation process, in accordance with one embodiment of the invention. A complete downloaded update may be accessed from the download queue 215. Using performance data relating to client device applications, the update processor determines whether an installation criteria 301 have been met. The installation criteria may be similar to the download criteria and may comprise one or more of the following criterion, or combinations thereof: the client application feature to be updated is not being utilized; overall processor usage is below a set threshold; and the like. If an installation criterion is not met, the downloaded update remains queued in download queue 215. Periodically, the update processor rechecks the performance data to determine whether installation criteria have been met. If installation criteria are met, the installation, 303, is made to processor memory for the client application on the client device. The update processor also processes performance data during the install to ensure that the installation criteria continue to be met, 305. If during a download an installation criterion fails to be met, for example if the client device needs the processor for other uses, the installation is halted. Details relating to the portion already installed, and the remainder of the install may be stored in download queue 215. Installation is resumed when the install criteria are met again. When installation is complete, 307 details relating to the installed file may be maintained in an install queue 309. The capture processor may capture data from queue 309 to determine when additional updates are needed.

Although certain embodiments of the present invention have been described herein with reference to a client-server architecture and/or a particular network, the present invention should not be viewed as limited to a particular architecture or particular network configuration. Similarly, although certain embodiments of the present invention have been described with reference to a particular client computing system, the present invention should not be viewed as limited to a system using capture/queues or other systems/methods peculiar to the system described herein; particular processor or network or other performance or resource use parameters to make determinations of whether to initiate, cease, resume updating; or the like.

Further, although the present invention has been described with reference to a plurality of computing devices, an embodiment of the present invention may be used with a single computing device wherein a more current version of a software application component resides in fixed or removable memory.

The foregoing description of exemplary embodiments of the invention has been presented only for the purpose of illustration and description and is not intended to be exhaustive or to limit the invention to the embodiments disclosed. Numerous modifications and adaptations thereof will be apparent to those skilled in the art without departing from the spirit and scope of the present invention.

It should further be appreciated that reference throughout to "one embodiment" or "an embodiment" of the invention do not necessarily imply that the same embodiment is being referenced or that a particular feature is necessarily included in any other embodiment. Each claim, as may be amended from time to time, is hereby incorporated by reference into this description as one embodiment of the invention.

That which is claimed is:

1. A method comprising the following operations performed by at least one processor:
    initiating a download for an update to a software application on a computing device;
    storing the downloaded update in a queue;
    monitoring a level of processor activity of the computing device;
    determining if the monitored processor activity level is below a first threshold level;
    retrieving the downloaded update from the queue based on the determination that the monitored processor activity level is below the first threshold level; and
    installing the downloaded update to update the software application.

2. The method of claim 1, further comprising the following operations performed by the at least one processor:
    determining that the monitored processor activity level during the install is above the first threshold level; and
    halting the install of the update based on the determination.

3. The method of claim 2, further comprising the following operations performed by the at least one processor:
    during a halted install, determining that the monitored processor activity level is below the first threshold level; and
    resuming the install of the update.

4. The method of claim 3, further comprising the following operations performed by the at least one processor:
    storing an indication of an installed portion of the update during the halted install; and
    resuming the install of the update based on the stored indication.

5. The method of claim 1, wherein initiating the download for the update further comprises the following operations performed by the at least one processor:
    monitoring a level of network activity of the computing device; and
    initiating the download for the update to the software application based on the monitored level of network activity.

6. The method of claim 5, further comprising the following operations performed by the at least one processor:
    determining that the monitored network activity level during the download is above a second threshold level; and
    throttling or halting the download based on the determination.

7. The method of claim 6, further comprising the following operations performed by the at least one processor:

determining that the monitored network activity level during the download is below the second threshold level; and resuming the install of the download based on the determination.

8. The method of claim 5, wherein monitoring the level of network activity of the computing device comprises monitoring at least one of an outgoing network bandwidth or an incoming network bandwidth.

9. The method of claim 1, wherein initiating the download for the update further comprises the following operations performed by the at least one processor:

monitoring usage data for the software application; and initiating the download for the update to the software application based on the monitored usage data.

10. The method of claim 1, wherein the download is initiated based on a determination that the download can be masked by other processes on the computing device.

11. A system, comprising:

at least one processor; and a memory storing executable instructions that, when executed by the at least one processor, causes the at least one processor to perform the following operations:

initiating a download for an update to a software application on a computing device;

storing the downloaded update in a queue;

monitoring a level of processor activity of the computing device;

determining if the monitored processor activity level is below a first threshold level;

retrieving the downloaded update from the queue based on the determination that the monitored processor activity level is below the first threshold level; and installing the downloaded update to update the software application.

12. The system of claim 11, wherein the at least one processor further performs the following operations:

determining that the monitored processor activity level during the install is above the first threshold level; and halting the install of the update based on the determination.

13. The system of claim 12, wherein the at least one processor further performs the following operations:

during a halted install, determining that the monitored processor activity level is below the first threshold level; and resuming the install of the update.

14. The system of claim 13, wherein the at least one processor further performs the following operations:

storing an indication of an installed portion of the update during the halted install; and resuming the install of the update based on the stored indication.

15. The system of claim 11, wherein the at least one processor further performs the following operations:

monitoring a level of network activity of the computing device; and initiating the download for the update to the software application based on the monitored level of network activity.

16. The system of claim 15, wherein the at least one processor further performs the following operations:

determining that the monitored network activity level during the download is above a second threshold level; and throttling or halting the download based on the determination.

17. The system of claim 16, wherein the at least one processor further performs the following operations:

determining that the monitored network activity level during the download is below the second threshold level; and resuming the install of the download based on the determination.

18. The system of claim 15, wherein the at least one processor further performs the following operation to monitor the level of network activity of the computing device:

monitoring at least one of an outgoing network bandwidth or an incoming network bandwidth.

19. The system of claim 11, wherein the at least one processor further performs the following operations to initiate the download for the update further comprises:

monitoring usage data for the software application; and initiating the download for the update to the software application based on the monitored usage data.

20. A tangible, non-transitory computer-readable medium storing instructions that, when executed by at least one processor, cause the at least one processor to:

initiate a download for an update to a software application on a computing device;

store the downloaded update in a queue;

monitor a level of processor activity of the computing device;

determine if the monitored processor activity level is below a first threshold level;

retrieve the downloaded update from the queue based on the determination that the monitored processor activity level is below the first threshold level; and install the downloaded update to update the software application.

* * * * *